(12) United States Patent
Takaoka et al.

(10) Patent No.: US 9,160,145 B2
(45) Date of Patent: Oct. 13, 2015

(54) INSULATOR FOR SPARK PLUG AND SPARK PLUG

(71) Applicant: NGK SPARK PLUG CO., LTD., Nagoya, Aichi (JP)

(72) Inventors: Katsuya Takaoka, Aichi (JP); Yutaka Yokoyama, Aichi (JP); Kengo Fujimura, Aichi (JP); Hironori Uegaki, Aichi (JP); Hiroki Takeuchi, Aichi (JP); Hirokazu Kurono, Nagoya (JP); Toshitaka Honda, Aichi (JP); Kuniharu Tanaka, Aichi (JP); Takeshi Mitsuoka, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/273,026

(22) Filed: May 8, 2014

(65) Prior Publication Data

US 2014/0336035 A1 Nov. 13, 2014

(30) Foreign Application Priority Data

May 9, 2013 (JP) .................. 2013-099067

(51) Int. Cl.
*H01T 13/38* (2006.01)
*C04B 35/50* (2006.01)
*C04B 35/505* (2006.01)
*C04B 35/111* (2006.01)

(52) U.S. Cl.
CPC .............. *H01T 13/38* (2013.01); *C04B 35/111* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3241* (2013.01); *C04B 2235/3244* (2013.01); *C04B 2235/3251* (2013.01); *C04B 2235/3262* (2013.01); *C04B 2235/3272* (2013.01); *C04B 2235/3418* (2013.01); *C04B 2235/786* (2013.01); *C04B 2235/85* (2013.01)

(58) Field of Classification Search
CPC .. H01T 13/38; C04B 35/107; C04B 2235/85; C04B 35/111
See application file for complete search history.

(56) References Cited

U.S. PATENT DOCUMENTS

| 7,799,717 B2 * | 9/2010 | Walker, Jr. ............... 501/105 |
| 8,482,187 B2 * | 7/2013 | Takaoka et al. .......... 313/118 |
| 8,564,184 B2 * | 10/2013 | Kurono et al. ........... 313/143 |

(Continued)

FOREIGN PATENT DOCUMENTS

| JP | 2009-242234 | 10/2009 | ............ C04B 35/111 |
| JP | 4756087 | 6/2011 | ............ H01T 13/34 |
| JP | 2011-219301 | 11/2011 | ............ C04B 35/111 |

*Primary Examiner* — Karl Group
(74) *Attorney, Agent, or Firm* — Kusner & Jaffe

(57) ABSTRACT

An insulator for spark plug with a main constituent of alumina and containing silicon includes a grain boundary phase positioned between alumina particles. The grain boundary phase contains: a group 2A element; a rare earth element; and at least one kind of zirconium, titanium, chrome, niobium, manganese, and iron (a first element). Assuming that a total amount of the rare earth element is X (mass %), a total amount of the group 2A element is Y (mass %), and a total amount of the first element is Z (mass %), the following are met:

$0.40 \leq Y/X \leq 2.00$ $0.10 \leq Z/X \leq 0.40$.

16 Claims, 5 Drawing Sheets

(56) References Cited

U.S. PATENT DOCUMENTS

| | | | |
|---|---|---|---|
| 2006/0186780 A1* | 8/2006 | Ogata et al. | 313/118 |
| 2008/0143229 A1* | 6/2008 | Walker | 313/143 |
| 2009/0309474 A1* | 12/2009 | Nunome | 313/141 |
| 2011/0251042 A1 | 10/2011 | Araki et al. | 501/32 |
| 2012/0187819 A1* | 7/2012 | Takaoka et al. | 313/118 |
| 2012/0262049 A1 | 10/2012 | Kurono et al. | 313/141 |

* cited by examiner

FIG. 7 ized area is more likely to discharge than other area, and this may generate channeling again. Eventually, a so-called penetration where a hole penetrating through the insulator is formed. In view of this, the insulator is required to reduce the channeling (a property that inhibits the generation of the channeling is hereinafter referred to as an anti-channeling property).

INSULATOR FOR SPARK PLUG AND SPARK PLUG

CROSS-REFERENCE TO RELATED APPLICATION

This application is based on Japanese Patent Application No. 2013-099067 filed with the Japan Patent Office on May 9, 2013, the entire content of which is hereby incorporated by reference.

FIELD OF THE INVENTION

This disclosure relates to a spark plug used for an internal combustion engine or a similar component and an insulator for spark plug used for a spark plug.

BACKGROUND OF THE INVENTION

A spark plug used for an internal combustion engine or a similar component, for example, includes an insulator, a center electrode, a tubular metallic shell and a ground electrode. The insulator has an axial hole extending in the axis direction. The center electrode is disposed to be inserted into a front end side of an axial hole. The metallic shell is disposed at the outer circumference of the insulator. The ground electrode is secured to the front end portion of the metallic shell.

One known type of a spark plug (a so-called parallel electrode type and a transverse discharge type) has a gap between the front end portion of the ground electrode and the front end portion of the center electrode. Applying a voltage to the gap generates discharge in the air. In another known type of a spark plug (a so-called surface discharge type), the front end surface of the ground electrode is disposed so as to face the outer peripheral surface at the front end side of the center electrode. A part of a discharge path becomes a path that goes along the surface of the insulator. Nowadays, a plasma jet ignition plug has been proposed. In this plasma jet spark plug, the front end of the center electrode is positioned at a rear end side with respect to a front end of an insulator. Plasma is generated by turning on electric power between both electrodes where discharge is generated.

Generally, to obtain excellent thermal resistance, dielectric strength characteristics and mechanical strength, the insulator is formed with an alumina-based sintered body. The alumina-based sintered body is obtained by sintering an insulating material with a main constituent of alumina ($Al_2O_3$). Furthermore, in formation of the insulator, to achieve reduction in sintering temperature and improvement of sinterability (denseness of the insulator), for example, silicon oxide ($SiO_2$), calcium oxide (CaO), or magnesium oxide (MgO) is employed as sintering additive.

Additionally, to ensure excellent dielectric strength characteristics even under high temperatures, a technique that contains a rare earth element (for example, scandium (Sc), Y (yttrium), or a lanthanum (La)) in an insulator is proposed (for example, see JP-A-2009-242234). According to the technique, a melting point of a grain boundary phase in alumina particles can be heightened. This ensures reducing softening of the grain boundary phase when the insulator becomes a high temperature.

SUMMARY OF THE INVENTION

In accordance with the present invention, there is provided an insulator for spark plug with a main constituent of alumina and containing silicon. The spark plug includes a grain boundary phase positioned between alumina particles. The grain boundary phase contains: at least one kind of elements selected from a group of group 2A elements consisting of magnesium, calcium, strontium, and barium; at least one kind of elements selected from a group of rare earth elements consisting of lanthanum, neodymium, praseodymium, yttrium, ytterbium, and cerium; and at least one kind of elements selected from a first element group consisting of zirconium, titanium, chrome, niobium, manganese, and iron. Assuming that element determination is performed in a visual field of 180 μm×250 μm at any given cross section in terms of oxide with an electron probe microanalyzer (EPMA), and assuming that a total amount of an element selected from the group of rare earth elements is X (mass %), a total amount of an element selected from the group of group 2A elements is Y (mass %), and a total amount of an element selected from the first element group is Z (mass %), the following are met:

$0.40 \leq Y/X \leq 2.00$ $0.10 \leq Z/X \leq 0.40$.

DETAILED DESCRIPTION OF THE PREFERRED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With the above-described surface discharge type spark plug, discharge is generated so as to go along a surface of an insulator. Even with a plasma jet spark plug, discharge is generated so as to go along a surface of an insulator (an inner circumferential surface) in many cases. Furthermore, with the above-described parallel electrode type and transverse discharge type spark plugs, a conductive substance such as carbon may attach to the surface of the insulator or pressure in a combustion chamber may be increased. In these cases, discharge goes along the surface of the insulator may be generated between the center electrode and the metallic shell.

If discharge that goes along the surface of the insulator is generated, energy (heat) generated in association with the discharge cuts out the surface of the insulator positioned on a discharge path. Finally, a strip-shaped groove may be formed (what is called a channeling) at the insulator. Channeling locally thins a part of the wall of the insulator. In view of this, there is a possibly of declining dielectric strength characteristics and mechanical strength.

One purpose of this disclosure is to provide an insulator for spark plug and a spark plug. With these insulators for spark plugs and with such spark plugs, channeling can be effectively reduced while ensuring excellent dielectric strength characteristics. This prevents, with more certainty, that the dielectric strength characteristics and the mechanical strength decline or reduce.

Configurations suitable for achieving the above objects will next be described in itemized form. If needed, actions and effects peculiar to the configurations will be described additionally.

Configuration 1. In accordance with a first aspect of the present invention, there is provided an insulator for a spark plug that has a main constituent of alumina and containing silicon, and further includes a grain boundary phase positioned or formed between alumina particles. The grain boundary phase contains: at least one kind of elements selected from a group of group 2A elements consisting of magnesium, calcium, strontium, and barium; at least one kind of elements selected from a group of rare earth elements consisting of lanthanum, neodymium, praseodymium, yttrium, ytterbium, and cerium; and at least one kind of elements selected from a first element group consisting of zirconium, titanium, chrome, niobium, manganese, and iron. Assuming that element determination is performed in a visual field of 180 μm×250 μm at any given cross section in terms of oxides with an electron probe microanalyzer (EPMA), and assuming that a total amount of an element selected from the group of rare earth elements is X (mass %), a total amount of an element selected from the group of group 2A elements is Y (mass %), and a total amount of an element selected from the first element group is Z (mass %), the following are met:

$$0.40 \le Y/X \le 2.00$$

$$0.10 \le Z/X \le 0.40.$$

According to the above-described configuration 1, in sintering the insulator, an eutectic reaction of an element selected from the group of group 2A elements and alumina can form a low-melting-point liquid phase. Therefore, denseness of the insulator can be ensured. As a result, dielectric strength characteristics can be improved.

Meanwhile, an element selected from the group of group 2A elements is present as a low-melting-point glass phase in a grain boundary phase. Accordingly, under high temperatures (for example, 700° C. or more), the low-melting-point glass phase may be softened and the dielectric strength characteristics may be declined.

In this respect, according to the configuration 1, the grain boundary phase contains an element selected from the group of rare earth elements. Therefore, a high-melting-point glass phase (a crystal) containing Si component and an element selected from the group of rare earth elements can be formed in the grain boundary phase. This ensures reducing softening of the grain boundary phase under high temperatures. As a result, excellent dielectric strength characteristics can be maintained with more certainty.

Assume that a total amount of an element selected from the group of rare earth elements is X (mass %) and a total amount of an element selected from the group of group 2A elements is Y (mass %). Then, if 0.40>Y/X is met, a liquid phase with a low melting point may not be sufficiently formed. In this case, denseness of the insulator cannot be sufficiently improved. This may result in insufficient dielectric strength characteristics. If Y/X>2.00 is met, the melting point of the grain boundary phase is not sufficiently heightened. This may result in decline of dielectric strength characteristics under high temperatures. Considering these points, the configuration 1 is configured to meet $0.40 \le Y/X \le 2.00$.

Furthermore, discharge along the surface of the insulator is generated so as to mainly go along the surface of the grain boundary phase. According to the configuration 1, the grain boundary phase contains an element selected from the first element group (namely, a conductive element). In view of this, the grain boundary phase has a conductive property. This ensures dropping the insulation resistance at the grain boundary phase. As a result, when discharge that goes along the surface of the insulator is generated, energy (heat) generated in association with the discharge can be reduced. Therefore, the insulator positioned on the discharge path is less likely to be cut out, and channeling can be reduced with more certainty. As a result, decline in the dielectric strength performance and the mechanical strength can be prevented or reduced with more certainty.

Excessive low insulation resistance at the grain boundary phase may cause insufficient dielectric strength characteristics. Assume that a total amount of an element selected from the first element group is Z (mass %). The larger the total amount Z is, the lower the insulation resistance at the grain boundary phase is. Meanwhile, larger total amount Y forms many high-melting-point glass phases (crystals) at the grain boundary phase. As a result, insulation resistance is increased at the grain boundary phase. Based on these points, the configuration 1 is configured so as to meet $0.10 \le Z/X \le 0.40$. Therefore, a conductive property is provided to the grain boundary phase, and excessive low insulation resistance at the grain boundary phase can be prevented or reduced with more certainty. As a result, channeling can be effectively reduced, and excellent dielectric strength characteristics can be maintained with more certainty. That is, according to the configuration 1, to improve the anti-channeling property, a conductive element, which works disadvantageously in the aspect of dielectric strength characteristics, is contained on purpose. Additionally, Z/X is set within the above-described value range, ensuring maintaining excellent dielectric strength characteristics.

Configuration 2. In accordance with a second aspect of the present invention, there is provided an insulator for spark plug according to the configuration 1, wherein in the visual field, a ratio of area occupied by the grain boundary phase to an area occupied by the alumina particle is 0.020 or more to 0.060 or less.

If a ratio of an area occupied by the grain boundary phase to an area occupied by the alumina particle (an area ratio) is excessively large, when discharge goes along the insulator is generated, the alumina component and a constituent constituting the grain boundary phase are likely to react. This may cause embrittlement of the insulator. Thus, if the insulator is embrittled, even if energy generated in association with discharge is not excessively large, an amount of cut of the insulator, or a wear amount, becomes comparatively large. This may cause channeling to be likely to be generated.

In this respect, with the above-described configuration 2, the area ratio is set to 0.060 or less. In view of this, reaction of the alumina component with the constituent constituting the grain boundary phase during discharge can be reduced. Therefore, embrittlement of the insulator can be effectively prevented or reduced. As a result, an effect of reducing channeling can be further enhanced.

According to the configuration 2, in this respect, the area ratio is set to 0.020 or more. This sufficiently forms the grain boundary phase. Therefore, denseness of the insulator can be further enhanced. As a result, the dielectric strength characteristics can be further improved.

Configuration 3. In accordance with a third aspect of the present invention, there is provided an insulator for spark plug according to the configuration 1 or 2, wherein two or more kinds of elements selected from the first element group are present.

When discharge along the surface of the insulator is generated, the grain boundary phase containing a conductive element functions as a conductive path. Here, if an element selected from the first element group (the conductive element) is only one kind, the conductive path may be locally formed at the grain boundary phase. If the conductive path is locally formed, energy (heat) generated in association with the discharge becomes large. This is more likely to generate channeling.

In this respect, according to the above-described configuration 3, two kinds or more of elements selected from the first element group are present. In view of this, the conductive path can be formed more dispersed on the grain boundary phase. Therefore, energy (heat) generated during discharge can be further reduced effectively. As a result, anti-channeling property can be further improved.

Configuration 4. In accordance with a fourth aspect of the present invention, there is provided an insulator for spark plug according to any one of the configurations 1 to 3, wherein, in the visual field, an average grain size of the alumina particle is 2.0 μm or more to 4.5 μm or less.

From the starting point of discharge to the ending point of discharge, many conductive paths exist. Alumina particles with comparatively large average grain size tend to be dispersed in the length of the conductive paths. More specifically, in one certain insulator, the length of the conductive paths is approximately equal. In contrast to this, in another one insulator, a part of the conductive paths is likely to be comparatively long. With the insulator with a part of long conductive path, energy generated in association with discharge is likely to be large. In view of this, channeling is likely to occur. That is, the alumina particle with comparatively large average grain size may result in variation in the dielectric strength characteristics among a plurality of insulators.

In this respect, according to the above-described configuration 4, the average grain size of the alumina particle is set to 4.5 μm or less. Therefore, the conductive paths can be kept in approximately equal length among the plurality of insulators with more certainty. As a result, variation of the dielectric strength characteristics among the plurality of insulators can be effectively reduced. As a result, the configuration 4 achieves stably providing excellent dielectric strength characteristics.

Usually, the manufacturing process of the insulator includes a shaping process. The shaping process molds raw material powder containing alumina particle or a similar element. The outer circumference shape of the molded body obtained from alumina particle is shaped with a predetermined grindstone. If the average grain size of the alumina particle is excessively small, the alumina particle is likely to enter the polished surface of the grindstone (the grindstone is likely to be clogged) in the shaping process. Accordingly, a problem occurs in the shaping process. This may cause decline of productivity.

In this respect, according to the configuration 4, the average grain size of alumina particles is set to 2.0 μm or more. In view of this, clogging of the grindstone during manufacturing can be effectively prevented or reduced. As a result, decline of productivity can be prevented or reduced with more certainty.

Configuration 5. In accordance with a fifth aspect of the present invention, there is provided a spark plug that includes the insulator for a spark plug according to any one of configurations 1 to 4.

The configuration 5 provides an action and effect similar to the configuration 1 or a similar configuration.

Figure 1:
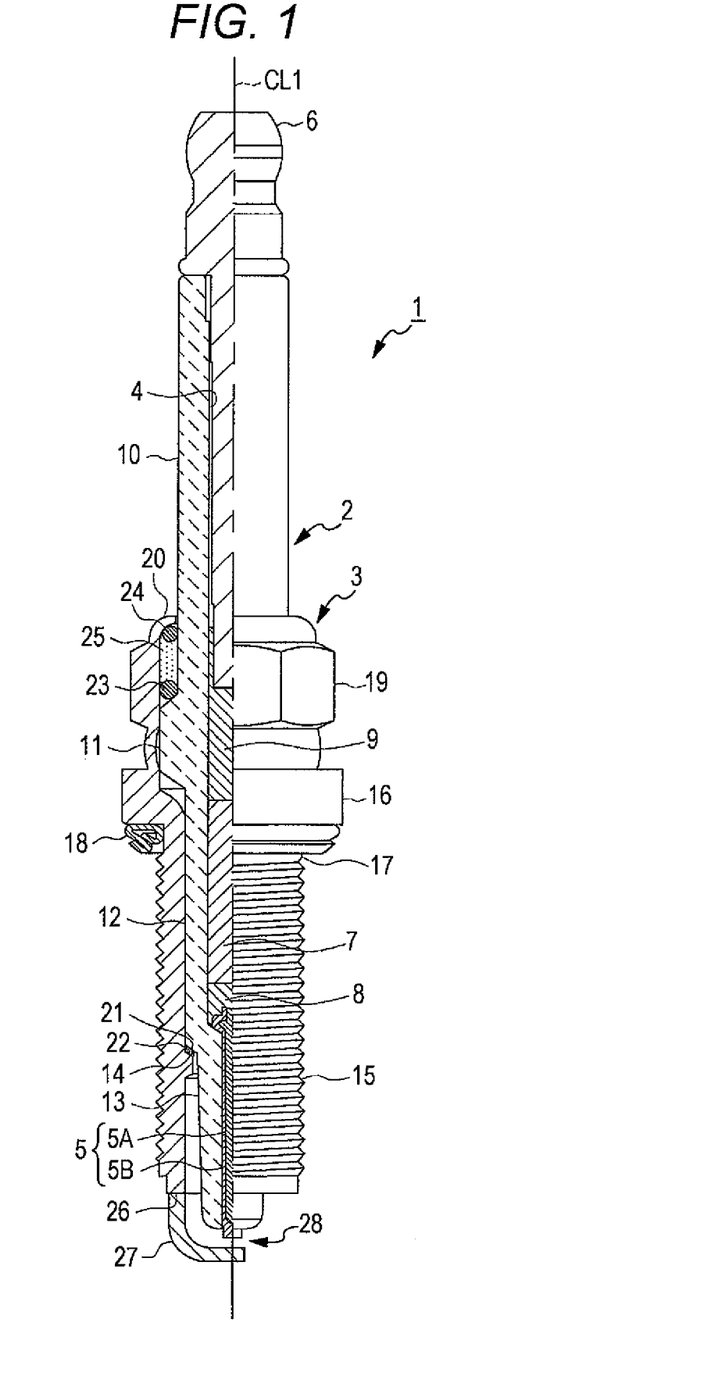
FIG. 1 is a partially sectioned front view illustrating a configuration of a spark plug.

One embodiment of this disclosure will next be described with reference to the drawings. FIG. 1 is a partially sectioned front view illustrating a spark plug 1. Notably, in FIG. 1, an axis CL1 direction of the spark plug 1 is referred to as the vertical direction in the drawing. The lower side of the spark plug 1 is referred to as the front end side of the spark plug 1, and the upper side as the rear end side.

The spark plug 1 includes a tubular insulator 2 as an insulator for spark plug, a tubular metallic shell 3, which holds the insulator 2, and a similar component.

The insulator 2 is formed from insulating ceramic with a main constituent of alumina and containing silicon (Si). The insulator 2, as viewed externally, includes a rear trunk portion 10 formed at the rear end side, a large-diameter portion 11, an intermediate trunk portion 12, and a leg portion 13. The large-diameter portion 11 is located frontward of the rear trunk portion 10 and projects radially outward. The intermediate trunk portion 12 is located frontward of the large-diameter portion 11 and is smaller in diameter than the large-diameter portion 11. The leg portion 13 is located frontward of the intermediate trunk portion 12 and is smaller in diameter than the intermediate trunk portion 12. The large-diameter portion 11, the intermediate trunk portion 12, and the greater portion of the leg portion 13 of the insulator 2 are accommodated within the metallic shell 3. In addition, a tapered step portion 14 is formed at a connection portion between the intermediate trunk portion 12 and the leg portion 13. The insulator 2 is seated on the metallic shell 3 at the step portion 14.

Further, the insulator 2 has an axial hole 4 extending therethrough along the axis CL1. A center electrode 5 is fixedly inserted into a front end portion of the axial hole 4. The center electrode 5 is composed of an inner layer 5A formed of a metal with high thermal conductivity (e.g., copper, a copper alloy, pure nickel (Ni), etc.), and an outer layer 5B formed of a Ni alloy which contains Ni as a main component. The center electrode 5 has a rod-like shape (columnar shape) as a whole. The front end portion of the center electrode 5 projects from the front end of the insulator 2.

Additionally, a terminal electrode 6 is fixedly inserted into a rear end portion of the axial hole 4 and projects from the rear end of the insulator 2.

A columnar resistor 7 is disposed within the axial hole 4 between the center electrode 5 and the terminal electrode 6. Opposite end portions of the resistor 7 are electrically connected to the center electrode 5 and the terminal electrode 6, respectively, via electrically conductive glass seal layers 8 and 9.

The metallic shell 3 is formed into a tubular shape from a low-carbon steel or a like metal. The metallic shell 3 has, on its outer circumferential surface, a threaded portion (externally threaded portion) 15. The threaded portion 15 is adapted to mount the spark plug 1 into a combustion apparatus, e.g., an internal combustion engine or a fuel cell reformer. The metallic shell 3 has, on its outer circumferential surface, a seat portion 16 located rearward of the threaded portion 15. A ring-like gasket 18 is fitted to a screw neck 17 at the rear end of the threaded portion 15. Further, the metallic shell 3 has, near the rear end thereof, a tool engagement portion 19 having a hexagonal cross section and a crimp portion 20. The tool engagement portion 19 allows a tool, such as a wrench, to be engaged therewith when the metallic shell 3 is to be mounted to the combustion apparatus. Also, the crimp portion 20 is bent radially inward.

In this embodiment, for downsizing of the spark plug 1 (smaller diameter), the diameter of the metallic shell 3 is formed small. Furthermore, a thread size of a threaded portion 15 is comparatively small (for example, M12 or less). In association with smaller diameter of the metallic shell 3, the wall thickness of the insulator 2 is comparatively small.

Moreover, a tapered step portion 21 is formed on the inner circumferential surface of the metallic shell 3 so as to receive the insulator 2, which butts against the step portion 21. The insulator 2 is inserted frontward into the metallic shell 3 from the rear end of the metallic shell 3. In a state in which the step portion 14 of the insulator 2 butts against the step portion 21 of the metallic shell 3, a rear-end opening portion of the metallic shell 3 is crimped radially inward (i.e., the above-mentioned crimp portion 20 is formed), whereby the insulator 2 is fixed to the metallic shell 3. An annular sheet packing 22 intervenes between the step portion 14 and the step portion 21. The sheet packing 22 retains the gastightness of a combustion chamber. Further, the sheet packing 22 suppresses or prevents outward leakage of fuel gas which enters the clearance between the inner circumferential surface of the metallic shell 3 and the leg portion 13 of the insulator 2, which is exposed to the combustion chamber.

Further, in order to ensure the gastightness which is established by crimping, annular ring members 23 and 24 intervene between the metallic shell 3 and the insulator 2 in a region near the rear end of the metallic shell 3, and a space between the ring members 23 and 24 is filled with powder of talc 25. That is, the metallic shell 3 holds the insulator 2 via the sheet packing 22, the ring members 23 and 24, and the talc 25.

Moreover, a ground electrode 27 is joined to a front end portion 26 of the metallic shell 3. The ground electrode 27 is bent at an intermediate portion thereof, and its front end surface faces a front end portion (e.g. a chip; not shown) of the center electrode 5. A spark discharge gap 28 is formed between the front end surface of the center electrode 5 (chip 31) and the front end portion (the other end portion) of the ground electrode 27, and spark discharge occurs at the spark discharge gap 28 in a direction approximately along the axis CL1.

Figure 2:
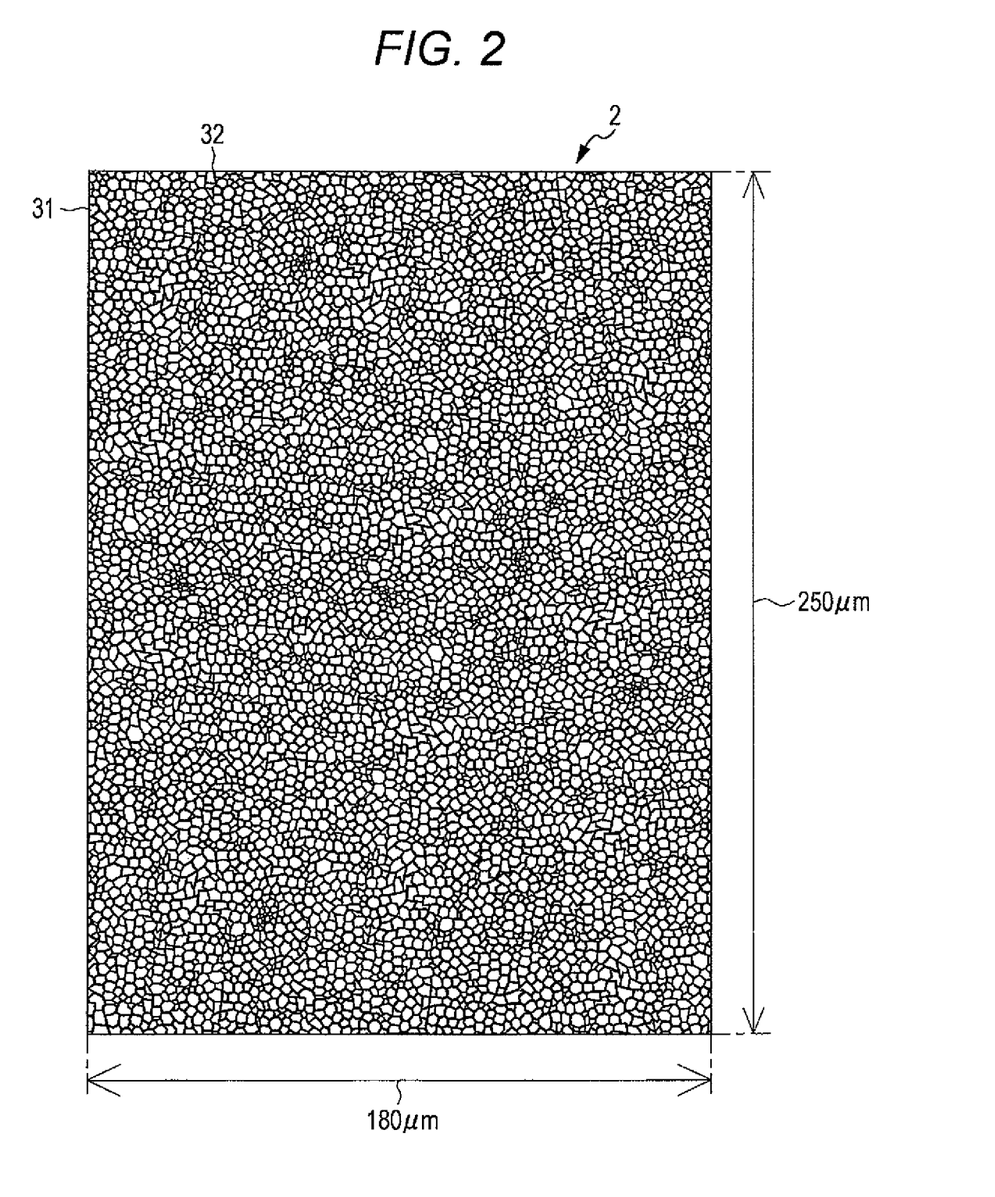
FIG. 2 is a cross-sectional schematic view illustrating a cross section of an insulator.
Figure 3:
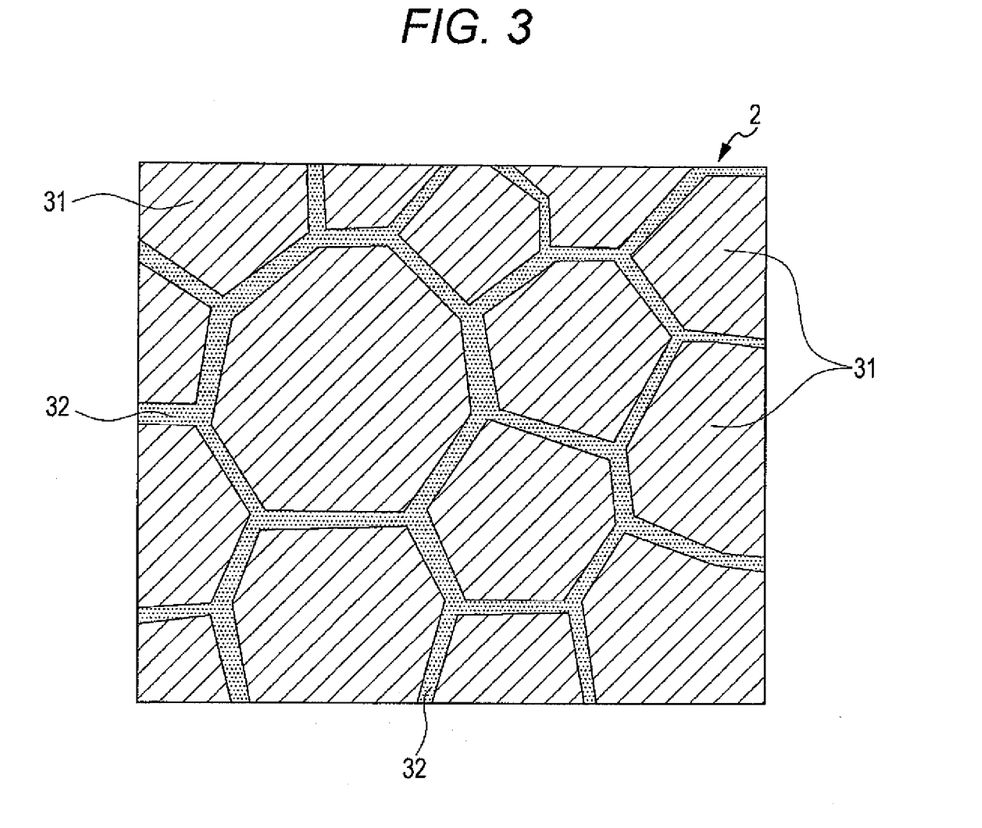
FIG. 3 is an enlarged cross-sectional schematic view illustrating alumina particles and grain boundary phases.

Furthermore, when determination of elements of the insulator 2 of this embodiment is performed with a predetermined electron probe microanalyzer in terms of oxides, the following results are obtained. That is, the insulator 2 contains a predetermined value of alumina (for example, 94 mass % or more to 99 mass % or less) and a predetermined value of Si (for example, 0.5 mass % or more to 3.5 mass % or less). As illustrated in FIG. 2 and FIG. 3, the insulator 2 includes alumina particles 31 and grain boundary phases 32. The grain boundary phase 32 is positioned between the alumina particles 31.

The alumina particle 31 is mainly formed of alumina and has excellent insulating property.

The grain boundary phase 32 is present so as to fill between the alumina particles 31. The grain boundary phase 32 contains at least one kind of element selected from the group of group 2A elements, at least one kind of element selected from the group of rare earth elements, and at least one kind of element selected from the first element group. The group of group 2A elements is a group constituted of magnesium (Mg), calcium (Ca), strontium (Sr), and barium (Ba). The group of rare earth elements is a group constituted of lanthanum (La), neodymium (Nd), praseodymium (Pr), yttrium (Y), ytterbium (Yb), and cerium (Ce). Furthermore, the first element group is group constituted of zirconium (Zr), titanium (Ti), chrome (Cr), niobium (Nb), manganese (Mn), and iron (Fe).

Furthermore, element determination is performed in a visual field of 180 μm×250 μm at any given cross section of the insulator 2 (an insulator leg portion 13 in this embodiment) in terms of oxide with the EPMA. Then, assume that a total amount of an element selected from the group of rare earth elements is X (mass %), a total amount of an element selected from the group of group 2A elements is Y (mass %), and a total amount of an element selected from the first element group is Z (mass %). In this case, the insulator 2 (the insulator leg portion 13) is configured so as to meet $0.4 \leq Y/X \leq 2.0$ and $0.1 \leq Z/X \leq 0.4$. In this embodiment, the element determination is performed after mirror polishing the cross section of the insulator 2. From an aspect of improving the dielectric strength characteristics and the anti-channeling property in the insulator 2 with more certainty, the following is preferred. The total amount X is preferred to be 0.3 mass % or more to 2.5 mass % or less. The total amount Y is preferred to be 0.05 mass % or more to 0.8 mass % or less. The total amount Z is preferred to be 0.05 mass % or more to 1.0 mass % or less. Furthermore, from an aspect of further reliably improving the dielectric strength characteristics and the anti-channeling property, the following is more preferred. The total amount X is more preferred to be 0.5 mass % or more to 1.5 mass % or less. The total amount Y is more preferred to be 0.1 mass % or more to 0.8 mass % or less. The total amount Z is more preferred to be 0.1 mass % or more to 0.3 mass % or less.

Additionally, in a visual field of 180 μm×250 μm at the cross section, the ratio of area occupied by the grain boundary phase 32 to the area occupied by the alumina particle 31 (the area ratio) is set to 0.02 or more to 0.06 or less. The area ratio can be obtained as follows. That is, mirror polishing is performed on the cut surface of the insulator 2. The polished surface is observed with a scanning electron microscope (SEM) (for example, an accelerating voltage: 20 kV, a spot size: 50, a COMPO image and a compositional image). Thus, an image where the entire polished surface is taken is obtained. Then, the obtained image is analyzed with predetermined image analysis software (for example, Analysis Five manufactured by Soft Imaging System GmbH). Thus, the area occupied by the alumina particle 31 and the area occupied by the grain boundary phase 32 are measured. Then, the area occupied by the grain boundary phase 32 is divided by the area occupied by the alumina particle 31. This ensures obtaining the area ratio. The area ratio can be adjusted by changing a content of each constituent in the insulator 2.

The insulator 2 is configured so as to include two kinds or more of elements selected from the first element group. In this embodiment, the total amount Z of the elements selected from the first element group is set to 0.50 mass % or less.

Furthermore, the average grain size of the alumina particle 31 in the visual field is set to 2.0 μm or more to 4.5 μm or less. The average grain size of the alumina particle 31 can be obtained by the following method. That is, the cross section of the insulator 2 is thermally etched for ten minutes under a temperature lower than the sintering temperature of the insulator 2 by 100° C. Afterwards, the cross section is observed with the SEM, and the grain size of each alumina particle 31 is obtained by an intercept method. Then, the average value of the grain size of each obtained alumina particle 31 is calculated. Thus, the average grain sizes of the alumina particle 31 can be obtained.

The insulator 2 is manufactured with a rubber press molding machine (not illustrated) with a tubular rubber mold. More specifically, raw material powder with main constituent of alumina powder is filled up in the rubber mold. Furthermore, applying force from the rubber mold to the raw material powder along a radial direction compresses and molds the raw material powder. Thus, a molded body is obtained. Then, the outer circumference of the molded body is shaped with a predetermined grindstone. Afterwards, the shaped molded body is sintered. Thus, the insulator 2 can be obtained. The average grain size of the alumina particle 31 can be adjusted by the following methods. The grain size of the alumina powder contained in the raw material powder is changed, and/or a heating temperature of the molded body during the sintering process is changed.

As details are described above, according to the embodiment, the insulator 2 is configured to meet $0.40 \leq Y/X \leq 2.00$. Therefore, when the insulator 2 is obtained, an eutectic reaction of an element selected from the group of group 2A elements and alumina can sufficiently form a low-melting-point liquid phase. Furthermore, a high-melting-point glass phase (a crystal) containing Si component and an element selected from the group of rare earth elements can be sufficiently formed. Accordingly, the insulator 2 can be minute (i.e. small), also ensuring the grain boundary phase 32 with high melting point. As a result, the insulator 2 can maintain excellent dielectric strength characteristics even under high temperatures.

Furthermore, in this embodiment, the insulator 2 is configured to meet $0.10 \leq Z/X \leq 0.40$. Therefore, a conductive property can be provided to the grain boundary phase 32, and excessive decline of the insulation resistance of the grain boundary phase 32 can be prevented or reduced with more certainty. As a result, channeling is effectively reduced, and excellent dielectric strength characteristics can be maintained with more certainty.

In particular, in this embodiment, the thread size of the threaded portion 15 is comparatively small (for example, M12 or less), and the wall thickness of the insulator 2 is small. In this case, decline of the dielectric strength characteristics due to channeling is especially apprehended. However, according to the embodiment, channeling can be effectively reduced. Furthermore, decline in the dielectric strength characteristics can be reduced with more certainty. In other words, the above-described configuration is especially effective in a case where decline in the dielectric strength characteristics due to channeling is especially anticipated because the thread size of the threaded portion 15 is comparatively small (that is, the wall thickness of the insulator 2 is small).

Additionally, the ratio of area occupied by the grain boundary phase 32 to the area occupied by the alumina particle 31 (the area ratio) is set to 0.060 or less. In view of this, reaction of the alumina component to a constituent constituting the grain boundary phase 32 during discharge can be reduced. Therefore, embrittlement of the insulator 2 can be effectively prevented or reduced. As a result, an effect of reducing channeling can be further enhanced. In this embodiment, the area ratio is set to 0.020 or more. Therefore, denseness of the insulator 2 can be further enhanced. As a result, the dielectric strength characteristics can be further improved.

Two kinds of more of elements selected from the first element group are present in the insulator 2. In view of this, the conductive path can be formed more dispersed in the grain boundary phase 32. Therefore, energy (heat) generated during discharge can be further reduced effectively. As a result, anti-channeling property can be further improved.

Furthermore, in this embodiment, the average grain size of the alumina particle 31 is set to 4.5 µm or less. Therefore, the conductive paths can have approximately equal length among the plurality of insulators with more certainty. As a result, variation of the dielectric strength characteristics among the plurality of insulators 2 can be effectively reduced. As a result, the insulators 2 can stably achieve excellent dielectric strength characteristics.

The average grain size of alumina particle 31 is set to 2.0 µm or more. In view of this, clogging of the grindstone during manufacturing can be effectively prevented or reduced. As a result, decline of productivity can be prevented or reduced with more certainty.

Next, in order to confirm the action and effect achieved by the above-described embodiment, a plurality of specimens (samples) were manufactured. A dielectric strength characteristics evaluation test and the anti-channeling property evaluation test were conducted on each specimen. In these specimens, the total amount of an element selected from the group of rare earth elements X (mass %), the total amount of an element selected from the group of group 2A elements Y (mass %), the total amount of an element selected from the first element group Z (mass %), the ratio of the area occupied by the grain boundary phase to the area occupied by the alumina particle (the area ratio), and the average grain size of alumina particle were variously changed. The total amounts X, Y, and Z were specified by element determination in a visual field of 180 µm×250 µm at any given cross section of the specimens in terms of oxide with the electron probe microanalyzer (EPMA).

Figure 4:
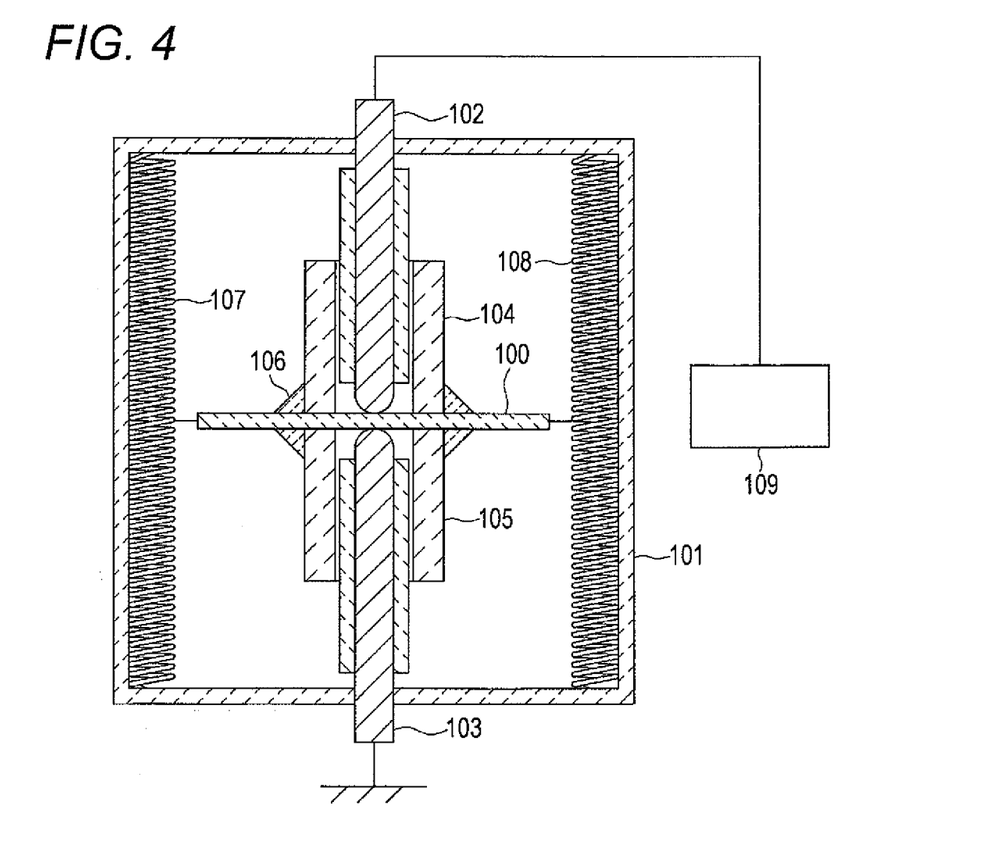
FIG. 4 is an explanatory view describing a method for a dielectric strength characteristics evaluation test.

The overview of the dielectric strength characteristics evaluation test is as follows. That is, as illustrated in FIG. 4, a specimen 100 was sandwiched by end portions of rod-shaped electrodes 102 and 103 in a heating box 101. The specimen 100 was secured with insulating pipes 104 and 105 made of alumina and a sealing glass 106. Next, the inside of the heating box 101 was heated to 700° C. or 800° C. with electric heaters 107 and 108. Then, a high voltage was applied to between both electrodes 102 and 103 with a predetermined high voltage generator 109. A voltage was measured when a discharge penetrates the specimen 100 between the electrodes 102 and 103. Then, the measured voltage was divided by the thickness of the specimen 100 (the thickness of the specimens was 0.65 mm). Thus, dielectric strength per I mm thickness (kV/mm) was obtained. Furthermore, average values (Ave) and standard deviations (s) of dielectric strength at the specimens 100 with the same total amount X were calculated. The average value of the dielectric strength at the heating temperature of 800° C. was subtracted from the average value of the dielectric strength at the heating temperature of 700° C. The value obtained by this subtraction was divided by the average value of the dielectric strength at the heating temperature of 700° C. Thus, a reduction rate of the dielectric strength (dielectric strength reduction rate) was calculated. Small dielectric strength reduction rate means that the dielectric strength characteristics is less likely to decline even if the specimen 100 is disposed under even more high temperatures. This also means that excellent dielectric strength characteristics can be maintained under high temperatures with more certainty.

Figure 5A:
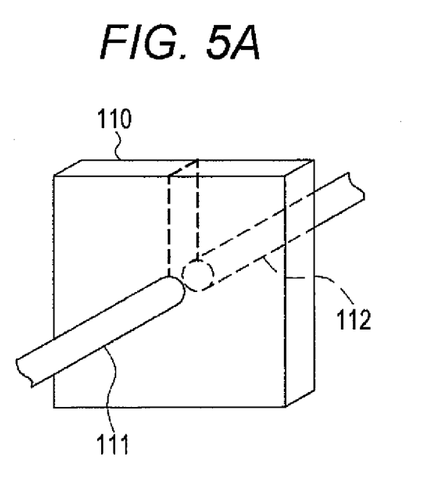
FIG. 5A and FIG. 5B are explanatory views describing a method for an anti-channeling property evaluation test.
Figure 5B:
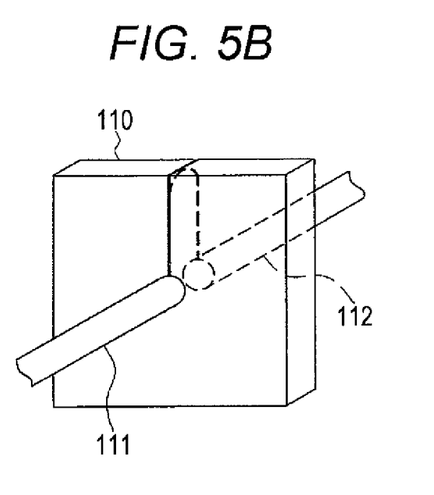

The overview of the anti-channeling property evaluation test is as follows. That is, as illustrated in FIG. 5A, a specimen 110 of 10 mm×10 mm×3 mm was sandwiched with end portions of rod-shaped (needle-shaped) electrodes 111 and 112 (the electrodes 111 and 112 contacted the specimen 110). In this state, a voltage of 10 kV or 20 kV was applied between both electrodes 111 and 112. This generated discharge goes along the surface of the specimen 110 (shown with the bold line in FIG. 5B) between both electrodes 111 and 112. This was repeatedly performed for 20 hours. [By repeatedly generating discharges, as illustrated in FIG. 5B, a part positioned on the discharge path of the specimen 110 was cut off]. Then, after 20 hours has passed, the weight of the specimen 110 was measured. A reduced amount of the specimen 110 (a cut amount or wear amount) with respect to the weight of the specimen 110 before the tests was measured. Small cut amount means that channeling is less likely to occur since the insulator is not worn out so much during discharge.

Table 1 illustrates results of both tests. Each specimen mainly contains alumina and contains Si.

TABLE 1

| | Composition (mass %) | | | | | | | | | | | | | | |
|---|---|---|---|---|---|---|---|---|---|---|---|---|---|---|---|
| | | | Group of rare earth elements (X) | | | | | Group of group 2A elements (Y) | | | | First element group (Z) | | | |
| No. | $Al_2O_3$ | $SiO_2$ | $La_2O_3$ | $Nd_2O_3$ | $Pr_2O_3$ | $Y_2O_3$ | $Yb_2O_3$ | MgO | BaO | CaO | SrO | $ZrO_2$ | $TiO_2$ | $Cr_2O_3$ | $Nb_2O_5$ |
| 1 | 94.45 | 2.78 | | | | 2.03 | | 0.45 | | | 0.30 | | | | |
| 2 | 94.71 | 2.87 | | | | | 1.87 | | 0.34 | 0.41 | | | | | |
| 3 | 98.29 | 1.03 | | | | 0.32 | | 0.06 | 0.12 | 0.18 | | | | | |
| 4 | 98.63 | 0.53 | 0.28 | | | | | 0.12 | | | 0.44 | | | | |
| 5 | 98.65 | 0.53 | | | | 0.28 | | 0.30 | | | 0.26 | | | | |
| 6 | 98.17 | 0.79 | | 0.68 | | | | | 0.31 | | | 0.05 | | | |
| 7 | 98.42 | 0.82 | | | 0.40 | | | | | 0.08 | 0.09 | | | | |
| 8 | 95.75 | 2.55 | 1.13 | | | | | 0.45 | | | | 0.12 | | | |
| 9 | 95.79 | 2.54 | 1.09 | | | | | | 0.45 | | | 0.13 | | | |
| 10 | 95.57 | 2.76 | 1.10 | | | | | | | 0.45 | | 0.12 | | | |
| 11 | 95.64 | 2.68 | 1.11 | | | | | | | | 0.45 | 0.12 | | | |
| 12 | 95.78 | 2.98 | 0.77 | | | | | 0.39 | | | | 0.08 | | | |
| 13 | 98.33 | 0.75 | | 0.60 | | | | 0.24 | | | | | 0.08 | | |
| 14 | 98.40 | 0.74 | | | 0.55 | | | 0.22 | | | | | 0.09 | | |
| 15 | 98.41 | 0.75 | | | | 0.53 | | 0.21 | | | | | 0.10 | | |
| 16 | 98.57 | 0.56 | | | | | 0.54 | 0.22 | | | | | 0.11 | | |
| 17 | 98.02 | 0.75 | | | 0.38 | | | | 0.28 | | 0.48 | 0.09 | | | |
| 18 | 98.01 | 0.75 | | | 0.39 | | | | 0.27 | 0.49 | | | 0.09 | | |
| 19 | 98.03 | 0.74 | | | 0.39 | | | 0.49 | 0.26 | | | | | 0.09 | |
| 20 | 98.04 | 0.74 | | | 0.38 | | | | 0.25 | | 0.50 | | | | 0.09 |
| 21 | 98.19 | 0.68 | | | 0.35 | | | | 0.27 | 0.42 | | | | | |
| 22 | 98.14 | 0.70 | | | 0.36 | | | | 0.26 | 0.45 | | | | | |
| 23 | 95.52 | 0.32 | | | | 2.21 | | | 0.58 | | 0.48 | | | 0.89 | |
| 24 | 98.08 | 0.77 | | | | | 0.55 | 0.12 | 0.19 | 0.11 | | | | 0.18 | |
| 25 | 94.38 | 3.08 | 1.39 | | | | | 0.12 | | 0.67 | 0.21 | 0.15 | | | |
| 26 | 96.76 | 1.12 | | | 1.24 | | | 0.09 | 0.33 | 0.28 | | | | | |
| 27 | 96.52 | 1.09 | | | | 1.39 | | | 0.29 | 0.43 | 0.12 | | | | 0.16 |
| 28 | 96.50 | 0.98 | | | | | 1.44 | 0.12 | | 0.78 | | | | 0.18 | |
| 29 | 96.25 | 1.15 | 1.26 | | | | | 0.12 | 0.29 | 0.43 | | 0.28 | | | |
| 30 | 97.16 | 0.99 | | | 1.02 | | | 0.22 | 0.29 | | | 0.12 | 0.08 | 0.12 | |
| 31 | 96.59 | 0.93 | | | | | 1.46 | 0.19 | | 0.49 | 0.09 | | | | 0.11 |
| 32 | 96.52 | 1.04 | | | | | 1.49 | 0.14 | 0.12 | 0.22 | 0.21 | | 0.13 | | |
| 33 | 96.41 | 1.05 | | 1.52 | | | | 0.12 | 0.32 | 0.22 | | 0.09 | 0.19 | | |
| 34 | 96.67 | 1.04 | | | | 1.22 | | | 0.41 | 0.21 | 0.22 | | 0.12 | | |

| | Composition (mass %) First element group (Z) | | | | | Average Grain Size (μm) | Dielectric strength (kV/min) | | | | Dielectric Strength reduction rate | Cut amount (mg) | |
|---|---|---|---|---|---|---|---|---|---|---|---|---|---|
| | | | | | | | 700° C. | | 800° C. | | | | |
| No. | $MoO_2$ | $Fe_2O_3$ | Y/X | Z/X | Area ratio | | Ave | σ | Ave | σ | | 10 KV | 20 KV |
| 1 | | | 0.37 | 0.00 | 0.063 | 6.4 | 82 | 10.6 | 69 | 11.1 | 15.9 | 4.5 | 8.9 |
| 2 | | | 0.40 | 0.00 | 0.066 | 6.1 | 102 | 10.5 | 76 | 11.5 | 25.2 | 4.7 | 8.7 |
| 3 | | | 1.13 | 0.00 | 0.017 | 5.5 | 95 | 14.2 | 80 | 10.2 | 15.8 | 4.3 | 8.5 |
| 4 | | | 2.00 | 0.00 | 0.014 | 5.3 | 94 | 11.9 | 80 | 10.9 | 14.9 | 4.8 | 8.7 |
| 5 | | | 2.15 | 0.00 | 0.014 | 7.9 | 87 | 13.8 | 65 | 14.2 | 25.3 | 4.6 | 8.8 |
| 6 | | | 0.46 | 0.07 | 0.019 | 7.1 | 92 | 14.4 | 79 | 12.2 | 14.1 | 4.7 | 8.3 |
| 7 | | 0.19 | 0.43 | 0.48 | 0.016 | 6.2 | 79 | 11.9 | 52 | 10.9 | 34.2 | 3.6 | 7.2 |
| 8 | | | 0.40 | 0.11 | 0.066 | 4.7 | 103 | 10.2 | 88 | 9.7 | 14.6 | 3.6 | 7.8 |
| 9 | | | 0.41 | 0.12 | 0.062 | 5.2 | 103 | 10.4 | 84 | 9.5 | 18.4 | 3.3 | 7.8 |
| 10 | | | 0.41 | 0.11 | 0.070 | 4.8 | 102 | 10.5 | 84 | 9.4 | 17.6 | 3.2 | 7.9 |
| 11 | | | 0.41 | 0.11 | 0.061 | 5.3 | 101 | 10.6 | 83 | 9.7 | 17.8 | 3.6 | 7.8 |
| 12 | | | 0.51 | 0.10 | 0.063 | 5.3 | 104 | 10.8 | 84 | 9.4 | 19.2 | 3.4 | 7.7 |
| 13 | | | 0.40 | 0.13 | 0.017 | 5.2 | 95 | 10.3 | 81 | 9.6 | 14.7 | 3.3 | 7.4 |
| 14 | | | 0.40 | 0.16 | 0.016 | 4.8 | 96 | 10.4 | 82 | 9.8 | 14.6 | 3.4 | 7.5 |
| 15 | | | 0.40 | 0.19 | 0.016 | 4.7 | 93 | 10.4 | 79 | 9.5 | 15.1 | 3.5 | 7.5 |
| 16 | | | 0.41 | 0.20 | 0.015 | 4.6 | 95 | 10.2 | 81 | 9.6 | 14.7 | 3.6 | 7.5 |
| 17 | | | 2.00 | 0.24 | 0.020 | 4.9 | 92 | 10.9 | 79 | 9.4 | 14.1 | 3.4 | 7.5 |
| 18 | | | 1.95 | 0.23 | 0.020 | 4.6 | 98 | 10.8 | 83 | 9.6 | 15.3 | 3.4 | 7.3 |
| 19 | | | 1.92 | 0.23 | 0.020 | 4.8 | 96 | 10.4 | 82 | 9.4 | 14.6 | 3.5 | 7.4 |
| 20 | | | 1.97 | 0.24 | 0.020 | 5.0 | 97 | 10.3 | 82 | 9.2 | 15.5 | 3.6 | 7.3 |

TABLE 1-continued

| | | | | | | | | | | | | | |
|---|---|---|---|---|---|---|---|---|---|---|---|---|---|
| 21 | 0.09 | | 1.97 | 0.26 | 0.018 | 5.1 | 93 | 10.3 | 79 | 9.1 | 15.1 | 3.5 | 7.4 |
| 22 | | 0.09 | 1.97 | 0.25 | 0.019 | 4.8 | 94 | 10.4 | 80 | 9 | 14.9 | 3.5 | 7.5 |
| 23 | | | 0.48 | 0.40 | 0.062 | 4.7 | 95 | 10.6 | 81 | 9.1 | 14.7 | 3.9 | 7.5 |
| 24 | | | 0.76 | 0.33 | 0.020 | 5.2 | 105 | 10.7 | 90 | 9.4 | 14.3 | 3.3 | 7.4 |
| 25 | | | 0.72 | 0.11 | 0.060 | 5.5 | 104 | 10.4 | 90 | 9.3 | 13.5 | 3.3 | 7.5 |
| 26 | | 0.18 | 0.56 | 0.15 | 0.033 | 5.3 | 102 | 10.4 | 88 | 9.2 | 13.7 | 3.4 | 7.5 |
| 27 | | | 0.60 | 0.12 | 0.036 | 5.9 | 103 | 10.3 | 89 | 9.5 | 13.6 | 3.4 | 7.3 |
| 28 | | | 0.63 | 0.13 | 0.036 | 5.2 | 102 | 10.6 | 89 | 9.2 | 12.7 | 3.4 | 7.4 |
| 29 | 0.22 | | 0.67 | 0.40 | 0.039 | 5.3 | 109 | 10.2 | 92 | 9.3 | 15.6 | 2.5 | 5.8 |
| 30 | | | 0.40 | 0.20 | 0.029 | 4.7 | 108 | 10.3 | 93 | 9.4 | 13.9 | 2.4 | 5.7 |
| 31 | | 0.14 | 0.53 | 0.17 | 0.035 | 5.2 | 105 | 10.4 | 91 | 9.5 | 14.2 | 2.4 | 5.6 |
| 32 | 0.13 | | 0.46 | 0.17 | 0.036 | 2.0 | 10 | 6.4 | 96 | 6.3 | 9.4 | 2.3 | 5.5 |
| 33 | 0.08 | | 0.43 | 0.24 | 0.037 | 4.5 | 107 | 6.6 | 97 | 6.3 | 9.3 | 2.2 | 5.4 |
| 34 | | 0.11 | 0.69 | 0.19 | 0.034 | 3.6 | 109 | 6.7 | 99 | 6.2 | 9.2 | 2.1 | 5.4 |

As illustrated in Table 1, it was confirmed that the sample with Y/X of less than 0.40 (the sample 1) deteriorated in dielectric strength characteristics. This is considered due to the following. Since a low-melting-point liquid phase was not able to be sufficiently formed during sintering, denseness was declined (comparatively many pores were formed at the grain boundary phase).

The sample with Y/X of more than 2.00 (the sample 5) was also found to deteriorate in the dielectric strength characteristics. This is considered that the grain boundary phase failed to have a sufficiently high melting point.

Furthermore, it became apparent that the cut amounts of the samples with Z/X of less than 0.10 (the samples 1 to 6) were increased in the anti-channeling property evaluation test. This indicates that channeling is likely to occur. This is considered due to the following. Since the insulation resistance of the grain boundary phase was large, energy generated in association with discharge became large.

Additionally, it was found that the sample with Z/X of more than 0.40 (the sample 7) deteriorated in the dielectric strength characteristics. This was probably caused by excessively high conductive property of the grain boundary phase.

In contrast to this, it was found that the samples meeting $0.40 \leq Y/X \leq 2.00$ and $0.10 \leq Z/X \leq 0.40$ (the samples 8 to 34) featured excellent dielectric strength characteristics. (Specifically, the average value of the dielectric strength exceeded 90 kV/mm at the heating temperature of 700° C., and was 79 kV/mm or more at the heating temperature of 800° C.). Furthermore, it was found that these samples had excellent anti-channeling property. (Specifically, the cut amount was below of 4.0 mg at an applied voltage of 10 kV, and the cut amount was below of 8.0 mg at the applied voltage of 20 kV). This is considered due to the following. Meeting $0.40 \leq Y/X \leq 2.00$ improved the dielectric strength characteristics. Additionally, meeting $0.10 \leq Z/X \leq 0.40$ ensured reduction of energy generated in association with discharge while maintaining excellent dielectric strength characteristics.

Furthermore, the samples with the same Z/X value acting from the aspect of anti-channeling property and different area ratios (the samples 8 and 25) were compared. As a result, the sample with the area ratio of 0.060 or less (the sample 25) was confirmed to have more excellent anti-channeling property. This is considered due to the following. Reaction of alumina particle with the grain boundary phase in association with discharge was reduced, and embrittlement of the specimen (the sample) was effectively reduced.

Additionally, the samples with the same Y/X value acting from the aspect of dielectric strength characteristics and different area ratios (the samples 20 to 22) were compared. As a result, the sample with the area ratio of 0.020 or more (the sample 20) was found to have more improved dielectric strength characteristics. This is considered due to the following. Since the grain boundary phase was sufficiently formed, denseness of the specimen (the sample) was further enhanced.

The cut amounts of the samples containing two kinds or more of elements selected from the first element group (the samples 29 to 34) were far below of 3.0 mg at the heating temperature of 700° C. Additionally, the cut amount of heating temperature at 800° C. was below of 6.0 mg. That is, it became apparent that these samples had considerably excellent anti-channeling properties. This is considered due to the following. Since the conductive paths formed at the grain boundary phase were more dispersed, energy (heat) generated in association with discharge was further decreased.

Furthermore, it was found that the samples with the average grain size of alumina particle of 4.5 μm or less (the samples 32 to 34) had significantly small standard deviation (s) in dielectric strength, stably achieving excellent dielectric strength characteristics. This is considered due to the following. The length of the discharge path between a starting point of discharge and an ending point of discharge in each specimen (a sample) became approximately equal.

From an aspect of preventing or reducing decline of productivity, the average grain size of alumina particle is preferred to be 2.0 μm or more.

From the test results, to achieve excellent performance both in dielectric strength characteristics and anti-channeling property, it is preferred that the insulator be configured to meet $0.40 \leq Y/X \leq 2.00$ and $0.10 \leq Z/X \leq 0.40$.

From an aspect of further improving the anti-channeling property, it is more preferred that the ratio of the area occupied by the grain boundary phase to the area occupied by the alumina particle be 0.060 or less.

Additionally, to further improve the anti-channeling property, it is more preferred that the insulator be configured so as to include two kinds or more of elements selected from the first element group.

Additionally, to further improve the dielectric strength characteristics, it is more preferred that the ratio of the area occupied by the grain boundary phase to the area occupied by the alumina particle be 0.020 or more.

To achieve stable, excellent dielectric strength characteristics, it is more preferred that the average grain size of the alumina particle be 4.5 μm or less.

The technique of the present invention is not limited to the description in the embodiment, but may be embodied, for example, as follows. Of course, applications and modifications other than those exemplified below are also possible.

Figure 6:
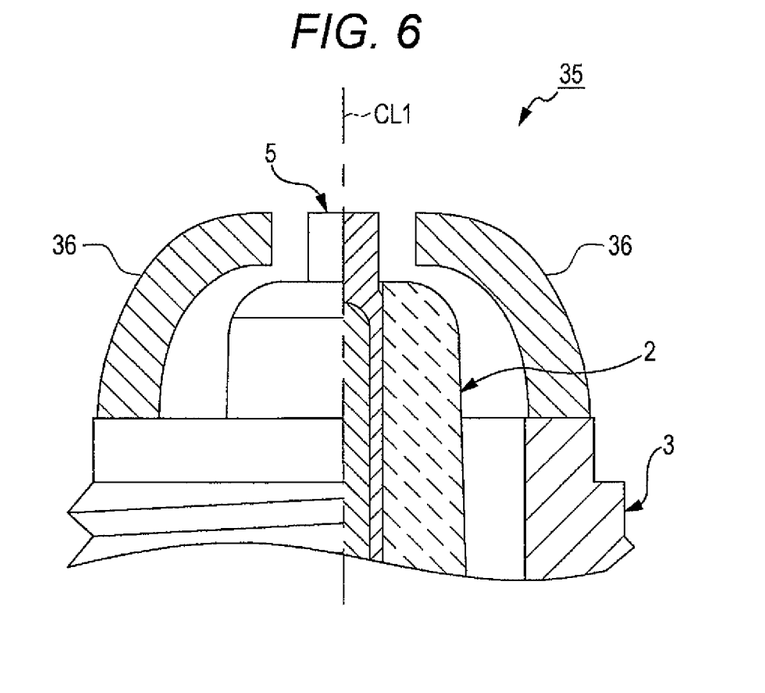
FIG. 6 is an enlarged, partially sectioned front view illustrating the configuration of the spark plug of another embodiment.
Figure 7:
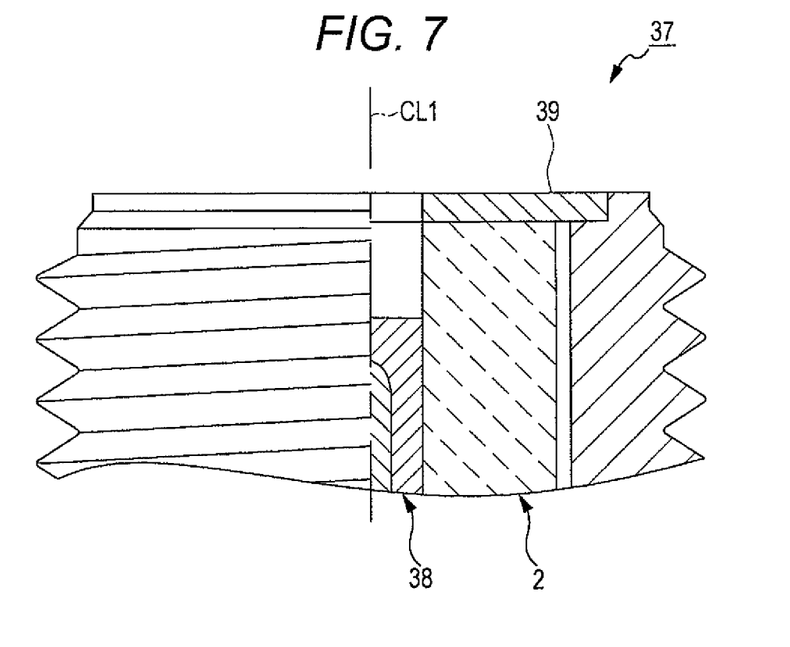
FIG. 7 is an enlarged, partially sectioned front view illustrating the configuration of the spark plug of another embodiment.

(a) In the embodiment, the spark plug 1 is a type that usually generates discharge at a spark discharge gap 28 in the air (a so-called parallel electrode type). Spark plugs that can apply this disclosure are not limited to this. Therefore, for example, as illustrated in FIG. 6, the technical idea of this disclosure may be applied to a so-called surface discharge type spark plug 35. In this spark plug 35, a front end surface of a ground electrode 36 faces the outer peripheral surface at the front end side of a center electrode 5. Furthermore, a part of the discharge path goes along the surface of the insulator 2. For example, as illustrated in FIG. 7, the technical idea of this disclosure may be applied to a plasma jet spark plug 37. In this plasma jet spark plug 37, a front end of a center electrode 38 is positioned, i.e. is recessed, at the rear end side with respect to the front end of the insulator 2. With this spark plug 37, discharge is generated between the center electrode 38 and the ground electrode 39 and then electric power is fed between both electrodes 38 and 39. This generates plasma. Applying the technical idea of this disclosure can reduce channeling even with the spark plugs 35 and 37 with more certainty. As a result, decline of dielectric strength characteristics and mechanical strength can be effectively prevented or reduced.

(b) In the embodiment, the thread size of the threaded portion 15 is comparatively small (for example, M12 or less). However, the thread size of the threaded portion 15 is not specifically limited.

(c) The embodiment specifically describes the case where a ground electrode 27 is joined to a front end portion 26 of the metallic shell 3. However, the ground electrode may be formed, through cutting operation, from a part of the metallic shell (or a part of a front end metallic shell welded to the metallic shell in advance). The technique of this disclosure is also applicable to a spark plug with such ground electrode (see, for example, JP-A-2006-236906).

(d) In the embodiment, a tool engagement portion 19 has a hexagonal cross section. However, the shape of the tool engagement portion 19 is not limited thereto. For example, the tool engagement portion 19 may have a Bi-HEX (modified dodecagonal) shape (ISO22977: 2005(E)).

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

Having described the invention, the following is claimed:

1. An insulator for spark plug with a main constituent of alumina and containing silicon, comprising
a grain boundary phase positioned between alumina particles, wherein the grain boundary phase contains:
at least one group 2A element selected from a group of group 2A elements consisting of a magnesium, calcium, strontium, and barium;
at least one rare earth element selected from a group of rare earth elements consisting of lanthanum, neodymium, praseodymium, yttrium, ytterbium, and cerium; and
at least one first element selected from a group of first elements consisting of zirconium, titanium, chrome, niobium, manganese, and iron, wherein
when element determination is performed in a visual field of 180 μm×250 μm at any given cross section in terms of oxide with an electron probe microanalyzer (EPMA), and defining a total amount of an element selected from the group of rare earth elements is X (mass %), a total amount of an element selected from the group of group 2A elements is Y (mass %), and a total amount of an element selected from the first element group is Z (mass %), the following are met:

$0.40 \leq Y/X \leq 2.00$ $0.10 \leq Z/X \leq 0.40$.

2. The insulator for spark plug according to claim 1, wherein, in the visual field, a ratio of area occupied by the grain boundary phase to an area occupied by the alumina particle is 0.020 or more to 0.060 or less.

3. The insulator for spark plug according to claim 1 or 2, wherein, two or more elements selected from the first element group are present.

4. The insulator for spark plug according to claim 1 or 2, wherein, in the visual field, an average grain size of the alumina particle is 2.0 μm or more to 4.5 μm or less.

5. The insulator for spark plug according to claim 1 or 2, wherein, in the visual field, an average grain size of the alumina particle is 2.0 μm or more to 4.5 μm or less.

6. The insulator for spark plug according to claim 1 or 2, wherein the total amount X is 0.3 mass % or more to 2.5 mass % or less.

7. The insulator for spark plug according to claim 1 or 2, wherein the total amount Y is 0.05 mass % or more to 0.8 mass % or less.

8. The insulator for spark plug according to claim 1 or 2, wherein the total amount Z is 0.05 mass % or more to 1.0 mass % or less.

9. A spark plug having an insulator, said insulator having a main constituent of alumina and containing silicon, said insulator comprising
a grain boundary phase positioned between alumina particles, wherein the grain boundary phase contains:
at least one group 2A element selected from a group of group 2A elements consisting of magnesium, calcium, strontium, and barium;
at least one rare earth element selected from a group of rare earth elements consisting of lanthanum, neodymium, praseodymium, yttrium, ytterbium, and cerium; and
at least one first element group element selected from a first element group elements consisting of zirconium, titanium, chrome, niobium, manganese, and iron, wherein
when element determination is performed in a visual field of 180 μm×250 μm at any given cross section in terms of oxide with an electron probe microanalyzer (EPMA), and defining a total amount of an element selected from the group of rare earth elements is X (mass %), a total amount of an element selected from the group of group 2A elements is Y (mass %), and a total amount of an element selected from the first element group is Z (mass %), the following are met:

$0.40 \leq Y/X \leq 2.00$ $0.10 \leq Z/X \leq 0.40$.

10. A spark plug according to claim 9, wherein, in the visual field, a ratio of area occupied by the grain boundary phase to an area occupied by the alumina particle is 0.020 or more to 0.060 or less.

11. A spark plug according to claim 9 or 10, wherein two or more elements selected from the first element group are present.

12. A spark plug according to claim 9 or 10, wherein, in the visual field, an average grain size of the alumina particle is 2.0 μm or more to 4.5 μm or less.

13. A spark plug according to claim 11, wherein, in the visual field, an average grain size of the alumina particle is 2.0 μm or more to 4.5 μm or less.

14. A spark plug according to claim 9 or 10, wherein the total amount X is 0.3 mass % or more to 2.5 mass % or less.

15. A spark plug according to claim 9 or 10, wherein the total amount Y is 0.05 mass % or more to 0.8 mass % or less.

16. A spark plug according to claim 9 or 10, wherein the total amount Z is 0.05 mass % or more to 1.0 mass % or less.

\* \* \* \* \*